United States Patent
Hirano et al.

(10) Patent No.: US 8,270,368 B2
(45) Date of Patent: Sep. 18, 2012

(54) RADIO COMMUNICATION TERMINAL AND NETWORK SIDE COMMUNICATION APPARATUS

(75) Inventors: Jun Hirano, Kanagawa (JP); Tien-Ming Benjamin Koh, Singapore (SG); Chan Wah Ng, Singapore (SG); Pek Yew Tan, Singapore (SG); Takashi Aramaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1025 days.

(21) Appl. No.: 12/066,061

(22) PCT Filed: Sep. 8, 2006

(86) PCT No.: PCT/JP2006/318311
§ 371 (c)(1),
(2), (4) Date: Mar. 6, 2008

(87) PCT Pub. No.: WO2007/029881
PCT Pub. Date: Mar. 15, 2007

(65) Prior Publication Data
US 2009/0135759 A1 May 28, 2009

(30) Foreign Application Priority Data

Sep. 9, 2005 (JP) ................................. 2005-263038
Mar. 10, 2006 (JP) ................................. 2006-066737

(51) Int. Cl.
*H04W 4/00* (2009.01)
*H04B 7/14* (2006.01)
*H04B 7/00* (2006.01)

(52) U.S. Cl. ......... 370/331; 370/338; 455/24; 455/63.4; 455/69

(58) Field of Classification Search ........................ None
See application file for complete search history.

(56) References Cited

U.S. PATENT DOCUMENTS

| 6,009,124 A * | 12/1999 | Smith et al. .................... 375/267 |
| 6,421,526 B1 * | 7/2002 | Banno ............................ 455/13.1 |
| 6,728,226 B1 * | 4/2004 | Naito ............................. 370/328 |

(Continued)

FOREIGN PATENT DOCUMENTS

EP 1 458 116 9/2004

(Continued)

OTHER PUBLICATIONS

International Search Report dated Mar. 27, 2007.

(Continued)

*Primary Examiner* — Andrew Chriss
(74) *Attorney, Agent, or Firm* — Dickinson Wright PLLC

(57) ABSTRACT

A technology is disclosed for achieving fast and reliable handover. According to this technology, in the network composition where a network coverage area of the cellular base station 105 and network coverage areas of plural WLAN AP (Wireless LAN access point) 110, 115, 120 and 130 overlaps, the roaming mobile node (mobile terminal) 100 stores the listened beacon information from each WLAN AP. The mobile node can promptly perform the handover procedures without waiting for listening to the next beacon by acquiring the beacon information of WLAN AP which is a handover target from the stored information at the instant of determining to do handover to a new WLAN AP. Furthermore, the mobile node can store information on stability of the network connection if it would be connected to each WLAN AP, and determine which WLAN AP is suitable for a handover target by considering the stability.

6 Claims, 7 Drawing Sheets

U.S. PATENT DOCUMENTS

| | | | |
|---|---|---|---|
| 6,907,244 B2* | 6/2005 | Santhoff et al. | 455/442 |
| 2003/0030101 A1 | 2/2003 | Tamura | |
| 2003/0112789 A1 | 6/2003 | Heinonen | |
| 2003/0193910 A1 | 10/2003 | Shoaib | |
| 2004/0066757 A1 | 4/2004 | Molteni | |
| 2004/0146035 A1 | 7/2004 | Lee | |
| 2004/0204098 A1* | 10/2004 | Owen | 455/561 |
| 2004/0213279 A1 | 10/2004 | Kusaki | |
| 2004/0246922 A1* | 12/2004 | Ruan et al. | 370/331 |
| 2005/0058112 A1 | 3/2005 | Lahey | |
| 2005/0068928 A1* | 3/2005 | Smith et al. | 370/338 |
| 2005/0164664 A1* | 7/2005 | DiFonzo et al. | 455/277.1 |
| 2007/0037523 A1* | 2/2007 | Bi et al. | 455/69 |
| 2007/0099669 A1* | 5/2007 | Sadri et al. | 455/562.1 |

FOREIGN PATENT DOCUMENTS

| | | |
|---|---|---|
| JP | 2003-333639 | 11/2003 |
| WO | 2004/032539 | 4/2004 |

OTHER PUBLICATIONS

Japanese Office Action dated Nov. 11, 2011.

* cited by examiner

ND NETWORK SIDE COMMUNICATION APPARATUS

RADIO COMMUNICATION TERMINAL AND NETWORK SIDE COMMUNICATION APPARATUS

TECHNICAL FIELD

The present invention relates to a radio communication terminal (also referred to as a mobile terminal or mobile node) and a network side communication apparatus with respect to the communication in a in a packet switched data communication network. More particularly, it concerns a radio communication terminal with different types of multiple access interfaces and a network side communication apparatus.

BACKGROUND ART

Mobile computing, which includes access to the Internet on the move, is getting more popular nowadays. Hand phones are increasing in functionality and usage of wireless LANs and the Internet is growing. Nowadays, more and more portable terminals have the ability to connect to the Internet using a wide range of access technologies, such as Third Generation (3G) cellular networks, General Packet Radio Service (GPRS), IEEE 802.11a/b/g and Bluetooth. Mobility refers to the fact that the network connection is available even when a node moves.

Various portable computing devices such as handheld mobiles, laptops and personal digital assistants (PDAs) with enhanced networking capabilities have increased the demand for seamless communication both in wired and wireless networks. Increased use of multimedia contents such as video conferencing makes seamless communication become an essential and required feature in mobile connections. Practical mobility management should provide seamless handoff where the user does not observe communication disruptions. Today's mobile data networks commonly consist of several wireless overlapping networks, supporting different data rates and geographical coverage and can only be accessed via media specific air interfaces.

Each time a mobile node changes a cell, a subnet or a network, coverage responsibilities have to be switched between respective serving access nodes. To provide seamless roaming among these heterogeneous networks, mobile nodes have to be capable of connecting to various access networks. Moreover, a comprehensive mutually agreed global mobile network architecture is required to manage the macro mobility. At the same time, with the wide range of wireless access technologies available, portable information terminals (multimode nodes) with multiple access interfaces are starting to appear. These include dual-mode hand phones, laptops and Personal Digital Assistants.

The usefulness of attaching to the Internet using different access technologies at different time or even simultaneously, has been described in various documents. However, protocols embedded in multi-mode nodes available in today's consumers market do not provide for seamless switching between heterogeneous interfaces. There are also some issues to be resolved when seamless switching between heterogeneous interfaces. With the multiplicity of overlapping available wireless networks, the availibility of a network in question may be transient or stable from the view of the mobile node.

For example, when a mobile node is roaming along the fringes of the wireless networks, the transient nature of the network coverage may cause spurious and needless handover between networks and media interfaces even though the stability for the practical use is not ensured. The overheads incurred in such handover would disrupt the user experience and cost unnecessary loading on the networks.

One solution of the following Patent Document 1 proposes a scheme to support service resumption when the mobile terminal roams among the coverage areas of wireless networks by tagging services with a local or global. Global services may be resumed when roaming by reinitiating contact with the same server via a different gateway.

Another solution of the following Patent Document 2 utilizes a Mobile Switching Centre in the network to send duplicated frames to a roaming mobile terminal with synchronized timing in order to affect soft handover. Duplicated frames sent from the terminal is also processed and removed by the Mobile Switching Centre.

Furthermore, another solution of the following Patent Document 3 proposes that a cellular timing receiver is installed in the wireless LAN access point in order for the cellular network and the wireless LAN to be synchronized so that soft handover may be performed.

[Patent Document 1] U.S. Patent Publication 20030112789A1

[Patent Document 2] U.S. Patent Publication 20040213279A1

[Patent Document 3] U.S. Patent Publication 20030030101A1

The above-mentioned solution disclosed in the Patent Document 1, however, does not optimize the handover process and also suffers from the fringe roaming problem described previously. The above-mentioned solution disclosed in the Patent Document 2, however, would not work across heterogeneous networks especially if the networks belong to different administrative domains or Service Providers. The above-mentioned solution disclosed in the Patent Document 3, however, would require participating cellular and wireless LAN networks to be synchronized, reducing the total user capacity. Furthermore, there may also be problems implementing this solution across different administrative domains, as in case of the above-mentioned solution disclosed in the Patent Document 2.

The above prior arts can be summarized as follows.

A mobile terminal cannot maintain the seamless connectivity, especially when performing handover across heterogeneous networks.

It is difficult that a mobile terminal determines whether an access network is transient or stable so as to perform efficient handover for the entire network.

There appears the fringe roaming problem causing unnecessary handover, especially when a mobile node is roaming along the fringe of the network coverage.

DISCLOSURE OF THE INVENTION

It is thus an object of the present invention to provide a radio communication terminal capable of achieving fast interface switching for seamless handover and/or performing efficient handover without unnecessary handover, and also capable of improving stability of the communication (especially, link connection) of a radio communication terminal, and a network side communication apparatus.

To achieve the object of the present invention, the present invention provides a radio communication terminal comprising:

plural radio communication interface means, each of plural radio communication interface means being capable of connecting to one or plural base stations, a beacon information storing means for storing information which is included in a beacon signal, the beacon signal being periodically sent from the base station and being received by each of the plural radio communication interface means, a beacon information retrieving means for retrieving information included in the beacon signal from the beacon information storing means, the beacon signal being received by the radio communication interface means which corresponds to a predetermined trigger according the predetermined trigger, and a communication control means for controlling to start communication on the radio communication interface means by using information included in the beacon signal, the beacon signal being retrieved by the beacon information retrieving means.

According to this construction, it is possible to achieve fast interface switching for seamless handover.

Furthermore, in addition to the above-mentioned construction, the radio communication terminal of the present invention comprises a communication switch controlling means for providing the predetermined trigger to the beacon information retrieving means upon initiating to communicate on any one of the plural radio communication interface means or upon switching a point of attachment on any one of the plural radio communication interface means, the predetermined trigger corresponding to the radio communication interface means which initiates to communicate or switches the base station to be connected.

According to this construction, it is possible to achieve fast interface switching by retrieving the previously stored information upon initiating communication via a radio communication interface or upon doing the handover process.

Furthermore, in addition to the above-mentioned construction, the radio communication terminal of the present invention comprises an information storage controlling means for controlling to listen the beacon signal on the radio communication interface or to store information included in the beacon signal into the beacon information storing means, based on any one of initiation timing of communication on the radio communication interface, switch timing of connection to the base station on the radio communication interface, and a policy about electric power.

According to this construction, it is possible to store information included in the beacon signals based on the schedule as applied to initiation or switch timing of communication, or capabilities of storing and saving electric power.

Furthermore, in addition to the above-mentioned construction, the radio communication terminal of the present invention comprises:

a stability information storing means for storing information about stability of communication with the base station which each of the plural radio communication interface means can connect to, and a stability determining means for determining whether the base station can be selected as a candidate for communication or not, based on the information about stability stored in the stability information storing means.

According to this construction, it is possible to achieve fast interface switching for seamless handover and perform efficient handover without unnecessary handover.

Furthermore, in addition to the above-mentioned construction, the radio communication terminal of the present invention comprises a stability evaluating means for evaluating stability of communication between each of the plural radio communication interface means and the base station based on the beacon signal received from the base station by each of the plural radio communication interface means, or based on information about stability of communication between other radio communication terminals and the base station, the information being informed from the other radio communication terminals.

According to this construction, it is possible for the radio communication terminal to evaluate stability of communication with a base station based on the beacon signal received from the base station, or information about stability of communication with the base station which is exchanged with the other radio communication terminals.

Furthermore, in addition to the above-mentioned construction, in the radio communication terminal of the present invention, the stability evaluating means is arranged to rank the base stations based on a time-variable pattern of the information about stability of communication or a frequency of detecting the beacon signals.

According to this construction, it is possible for the radio communication terminal to rank stability of communication with each base station.

Furthermore, in addition to the above-mentioned construction, the radio communication terminal of the present invention comprises:

a stability information storing means for storing information about stability of communication with the base station which each of the plural radio communication interface means can connect to, and a message sending means for sending a message requesting to improve the stability of communication to the base station whose stability becomes below a predetermined threshold level, referring the information about stability stored in the stability information storing means.

According to this construction, it is possible to improve stability of communication of a radio communication terminal improve.

Furthermore, in addition to the above-mentioned construction, in the radio communication terminal of the present invention, the message comprises at least an identification information of the base station, an identification information of the radio communication terminal, and communication characteristics information about communication with the base station.

According to this construction, the characteristics of communication between the source and destination can be grasped by referring the message.

Furthermore, in addition to the above-mentioned construction, the radio communication terminal of the present invention comprises a stability evaluating means for evaluating stability of communication between each of the plural radio communication interface means and the base station based on the beacon signal received from the base station by each of the plural radio communication interface means, or based on information about stability of communication between other radio communication terminals and the base station, the information being informed from the other radio communication terminals.

According to this construction, it is possible for the radio communication terminal to evaluate stability of communication with a base station based on the beacon signal received from the base station, or information about stability of communication with the base station which is exchanged with the other radio communication terminals.

Furthermore, in addition to the above-mentioned construction, in the radio communication terminal of the present invention, the stability evaluating means is arranged to rank the base stations based on a time-variable pattern of the information about stability of communication or a frequency of detecting the beacon signals.

According to this construction, it is possible for the radio communication terminal to rank stability of communication with each base station.

Moreover, to achieve the object of the present invention, the present invention provides a radio communication terminal comprising:

plural radio communication interface means, each of plural radio communication interface means being capable of connecting to one or plural base stations, a stability information storing means for storing information about stability of communication with the base station which each of the plural radio communication interface means can connect to, and a stability determining means for determining whether communication starts or not between the radio communication interface means and the base station, based on the information about stability stored in the stability information storing means.

According to this construction, it is possible to perform efficient handover without unnecessary handover.

Furthermore, in addition to the above-mentioned construction, the radio communication terminal of the present invention comprises a stability evaluating means for evaluating stability of communication between each of the plural radio communication interface means and the base station based on the beacon signal received from the base station by each of the plural radio communication interface means, or based on information about stability of communication between other radio communication terminals and the base station, the information being informed from the other radio communication terminals.

According to this construction, it is possible for the radio communication terminal to evaluate stability of communication with a base station based on the beacon signal received from the base station, or information about stability of communication with the base station which is exchanged with the other radio communication terminals.

Furthermore, in addition to the above-mentioned construction, in the radio communication terminal of the present invention, the stability evaluating means is arranged to rank the base stations based on a time-variable pattern of the information about stability of communication or a frequency of detecting the beacon signals.

According to this construction, it is possible for the radio communication terminal to rank stability of communication with each base station.

Moreover, to achieve the object of the present invention, the present invention provides a radio communication terminal comprising:

plural radio communication interface means, each of plural radio communication interface means being capable of connecting to one or plural base stations, a stability information storing means for storing information about stability of communication with the base station which each of the plural radio communication interface means can connect to, and a message sending means for sending a message requesting to improve the stability of communication to the base station whose stability becomes below a predetermined threshold level, referring the information about stability stored in the stability information storing means.

According to this construction, it is possible to improve stability of communication of a radio communication terminal.

Furthermore, in addition to the above-mentioned construction, in the radio communication terminal of the present invention, the message comprises at least an identification information of the base station, an identification information of the radio communication terminal, and communication characteristics information about communication with the base station.

According to this construction, the characteristics of communication between the source and destination can be grasped by referring the message.

Moreover, to achieve the object of the present invention, the present invention provides a network side communication apparatus accommodating a radio communication terminal, comprising:

a radio communication interface means for communicating the radio communication terminal, a message receiving means for receiving a message requesting to improve stability of communication with the radio communication terminal from the radio communication terminal via the radio communication interface means, and a communication stability improving means for improving the stability of communication with the radio communication terminal which is the source of the message by controlling operation of the radio communication interface means.

According to this construction, it is possible to improve stability of communication between a network side communication apparatus and a radio communication terminal.

Furthermore, in addition to the above-mentioned construction, in the network side communication apparatus of the present invention, the communication stability improving means is arranged to increase transmitting power or adjust directional characteristics toward the radio communication terminal as the controlled operation of the radio communication interface means.

According to this construction, the network side communication apparatus can improve stability of communication with the radio communication terminal by increasing transmitting power or adjusting directional characteristics.

The present invention comprising the foregoing construction has the advantage to achieve fast interface switching for seamless handover and/or perform efficient handover without unnecessary handover. The present invention also has the advantage to improve stability of the communication (especially, link connection) of a radio communication terminal.

BEST MODE FOR CARRYING OUT THE INVENTION

Figure 1:
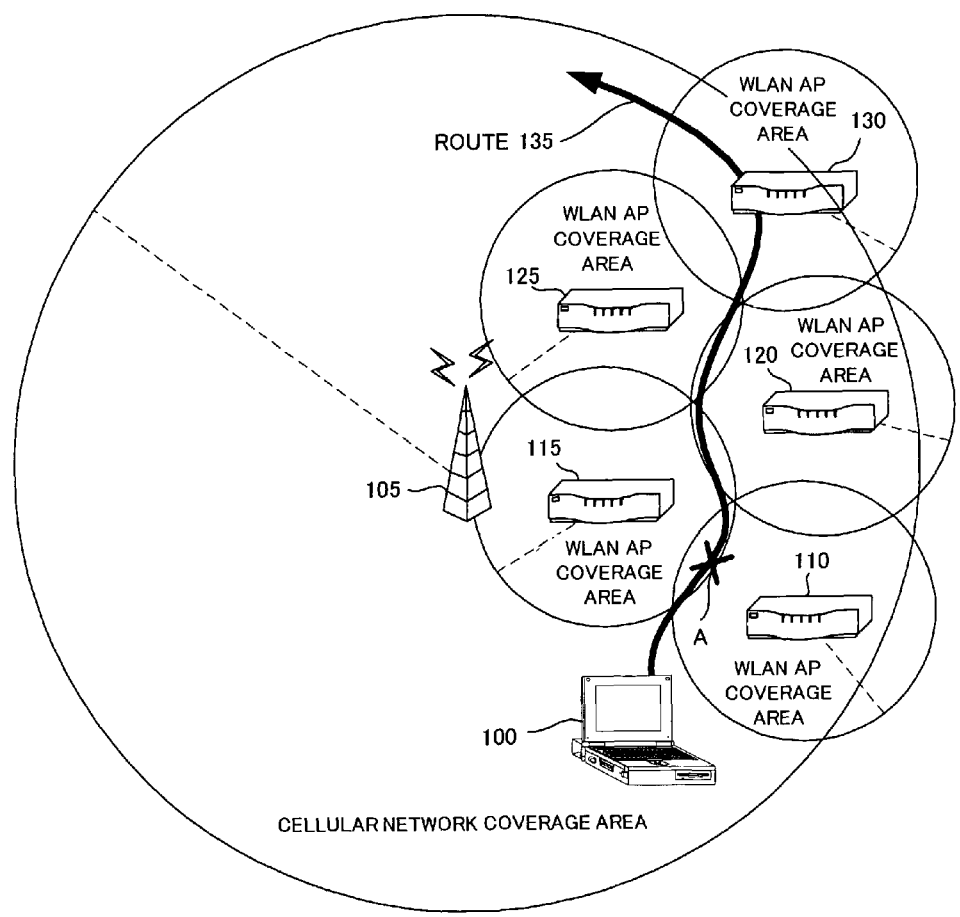
FIG. 1 is a diagram showing a overhead view of a network where a mobile node is roaming across multiple overlapping areas of network coverage in the embodiments of the present invention.

Description will be given below on the embodiments of the present invention referring to the drawings. FIG. 1 describes a typical example that a mobile node 100 is roaming in a neighborhood where there are multiple overlapping areas of network coverage such as a cellular base station 105 and WLAN AP 110, 115, 120, 125 and 130. In the description, a cellular base station is just referred to as a base station. It is possible that the mobile node 100 is taking a route 135 whereby it passes through the fringes of the overlapping WLAN network coverage areas while still staying within its cellular network coverage area. In order to be able to achieve fast yet reliable handoff, the system should include a few key features.

For fast interface switching, the system of the present invention should possess some means for the storage of broadcasted information even on interfaces that are not active or involved in current communication. Hence as an example, wireless LAN interfaces may be listening passively for any broadcasted beacon by neighboring access points or access routers. The received beacon information is stored.

Stored beacon information may be placed in a list or be continually replaced by the most recently received information (the newest information), dependent on the capabilities of the device. Hence nodes with strict power and/or information storage requirements may store only the most recently received beacon information while those with less strict requirements may store a larger number of beacon information. It may be useful to store beacon information in the case when the node is in an area covered by two or more access points or routers.

For devices storing more than one beacon information, it may be useful to store beacons according to the source identification. In this way, only the most recent beacon information from each source is stored rather than storing all the beacon information from a single source with a short beacon period.

For nodes that support lower layer hints or events such as LINK_GOING_UP (a trigger from the media interface indicating that a new link is about to become available) or LINK_GOING_DOWN (a trigger from the media interface indicating that a current link is about to become unavailable), the previously described method may be further enhanced. An example of such lower layer media interface events would be those provided by the Media Independent Handover Function which is being defined in IEEE802.21. The listening done on all interfaces may be tied to the receiving of a trigger warning of the going down of a current link or upon detection of a potential new link, hence conserving a mobile node's limited power.

When the mobile node decides to switch links or interfaces upon the unavailability of the currently used link or due to certain policy decisions, the mobile node must select an alternate interface or link to utilize. This selection may be influenced by the availability of stored information described previously, in addition to any other policy consideration. Upon successful selection of an interface, any stored information on the selected interface is immediately put to use and in this way the connectivity of the mobile node may be re-established quickly.

Figure 2:
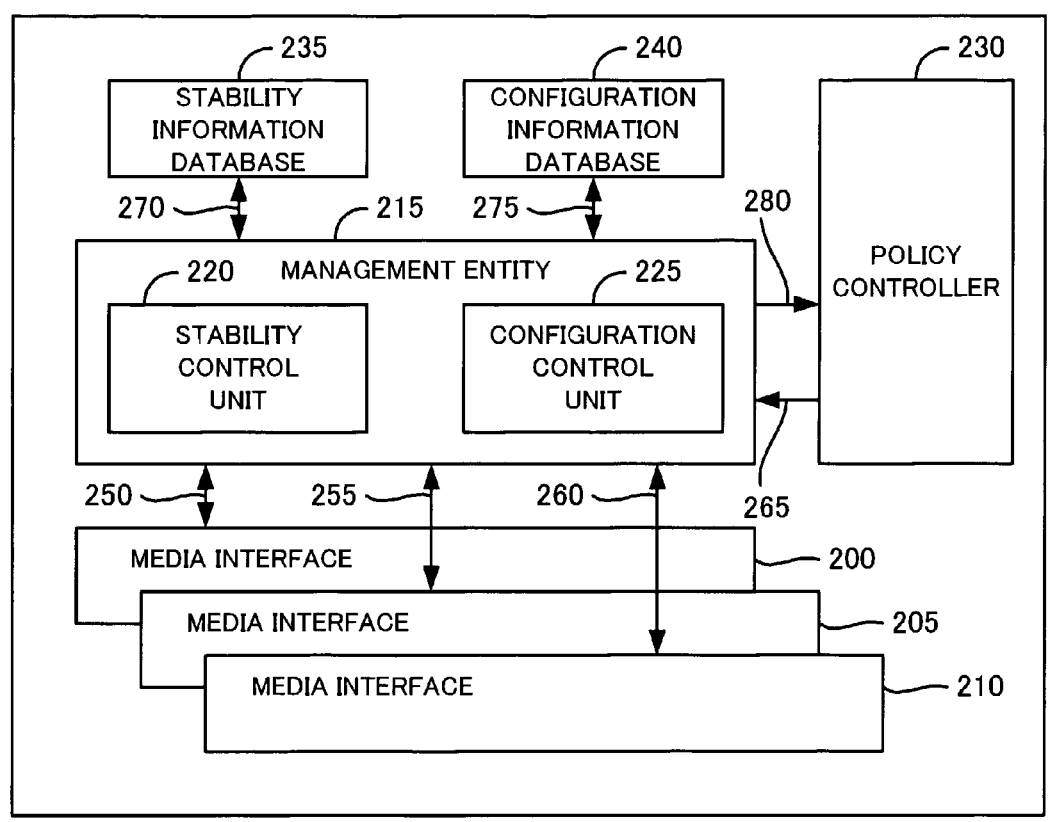
FIG. 2 is a block diagram showing an example of architecture of a mobile node in the embodiments of the present invention.

The functional architecture required by such a system is shown in FIG. 2. The Mobile node 100 includes Media Interfaces 200, 205 and 210. Media Interfaces 200, 205 and 210 are logical interfaces that may be viewed as the physical interface cards that the node uses to communicate with the external network. For example, Media Interfaces 200, 205 and 210 include WLAN cards, GSM cards or even modems.

Media Interfaces 200, 205 and 210 may also represent links to different points of attachment. For example, a Bluetooth interface that is connected to two separate peers may be viewed as two respective Media Interfaces, one for each peer. Media Interfaces 200, 205 and 210 communicate and are configured via respective message paths 250, 255 and 260 by the Management Entity 215.

The Management Entity 215 is a generic controller that manages the various network functionalities of the node. Additionally, the Management Entity 215 should contain at least a Stability Control Unit 220 and a Configuration Control Unit 225. It may also contain other functions such as those that decide and control handover from one attachment point to another. The Policy Controller 230 provides input information from its policies via message path 265 to the Management Entity 215 to aid in its decision making. Alternatively the Management Entity 215 may query the Policy Controller 230 via message path 280 for the relevant parameters.

The Management Entity 215 also has access to at least two logical databases, the Stability Information Database 235 and the Configuration Information Database 240. The Management Entity 215 may write or retrieve information from these databases via message paths 270 and 275 respectively.

The Stability Information Database 235 maintains information pertaining to the stability of any nearby or recently encountered potential network points of attachment. Examples of the stored information include the type of the access technology used to connect, the identifier for the point of attachment, its detected signal strength and Bit Error Rates (BER) or some other metric describing the stability of the point of attachment.

Media Interfaces 200, 205 and 210 may implement a detection function for detecting signal strength or Bit Error Rate, and the detection result such as signal strength or Bit Error Rate based on the reception of the beacon signal from a base station may be stored as a metric to indicate stability. The base station which is capable of connecting to Media Interfaces 200, 205 and 210 may send the above metric to indicate stability (for example, information indicating the state of the point of attachment) embedded in the beacon signal to a mobile node, and the mobile node can store the information in its Stability Information Database 235. Furthermore, each mobile node can obtain the metric of each point of attachment to indicate stability if the metrics are exchanged among mobile nodes. Stability of each point of attachment is ranked (classified) by the mobile node 100 on the basis of the metrics to indicate stability in the Stability Information Database 235. In this case, the mobile node 100 can classify stability, for example, so that the point of attachment having better quality of communication is higher-ranked, or so that the point of attachment is ranked in consideration of a pattern or a trend. The above pattern means a time trend of detecting a metric to indicate stability. In relation to the pattern, for example, the point of attachment is preferentially higher-ranked if its stability is gradually increased as time passes. The above trend means frequency of detection of a metric to indicate stability. In relation to the trend, for example, the point of attachment is preferentially higher-ranked if the frequency of detection of its metric in a given period of time is increased.

The Configuration Information Database 240 maintains any configuration information obtained from all potential points of attachment. This information may be an ordered list for each point of attachment or just the most recently received information depending on storage space concerns. Examples of such information may be the beacon message from WLAN access points which would include information such as future beacon intervals, supported data rates, parameter sets and capability information or higher layer information such as Router Advertisement messages which contain prefix information and other service announcements, which are carried over layer 2 links. The Stability Information Database 235 and Configuration Information Database 240 are preferably implemented by the information storing function of the Media Access Decision Unit placed between the Network Access Unit (including PHY (Physical layer), MAC (Media Access Control), LLC (Logical Link Control), etc.) and the higher layer (Layer 3 and above).

The Stability Control Unit 220 residing within the Management Entity 215 controls the classification of the stability of its peers. It processes received information and stores or retrieves them from the Stability Information Database 235. It may be configured to accept a range of thresholds or parameters in order to classify the potential points of attachment. It is also responsible for choosing the potential links or interfaces to be presented to the node for selection of the next handoff target on the basis of their stability metrics and any threshold parameter.

The Configuration Control Unit 225 controls the storage and retrieval of any received configuration information coming in from the Media Interface 200, 205 or 210. It is also responsible for passing the most recently received configuration information from a handoff target to the node once selection of the handoff target has been done.

Figure 3:
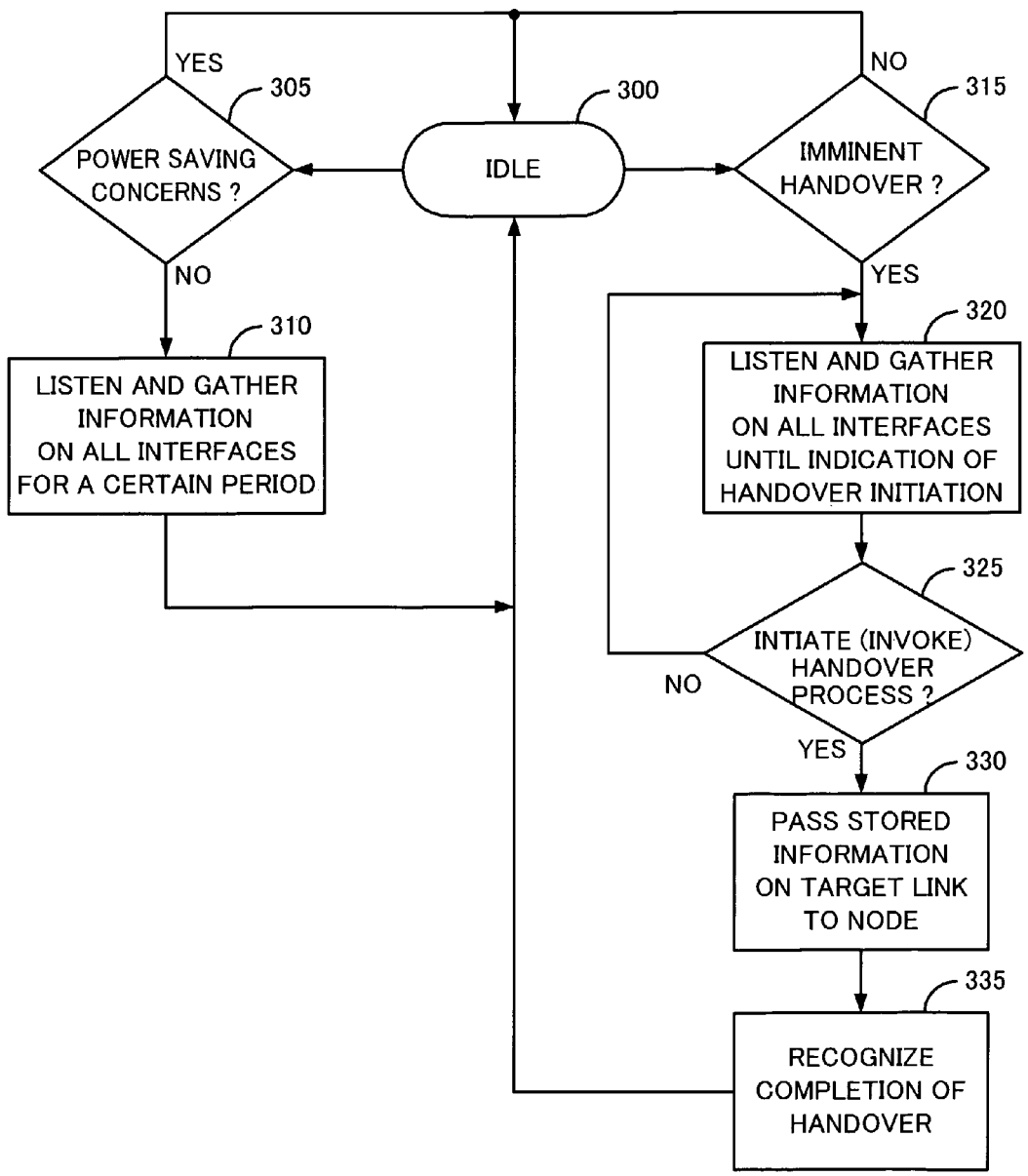
FIG. 3 is a state diagram showing fast interface switching operation in the embodiments of the present invention.

The operation for fast interface switching is shown in a state diagram of FIG. 3. In FIG. 3, the mobile node 100 starts off in an idle state (step 300). As shown by step 305, depending on its power policies, the mobile node may be actively gathering and storing information on nearby potential points of attachment (step 310), or only start its listening and storage processing (step 320) upon imminent handover (step 315).

When the handover process is determined (or indicated) to start, the handover process is promptly invoked (step 325). When the mobile node has selected an interface or link to handover to, the information on the selected interface or link (the previously stored information) is passed to the mobile node (step 330) for immediately processing handover without waiting for the next broadcasted beacon. The mobile node recognizes completion of any other necessary handover procedures (step 335) following which normal operating procedures will apply and then returns to the initial state (the idle state of step 300). If the information on the selected interface or link has not yet stored (for example, in the case that the necessary information could not be gathered before the determination of starting the handover process), normal procedures will be taken back, and then information gathered from the next broadcasted beacon is passed to the mobile node.

When the mobile node 100 is roaming along the fringes of overlapping network coverage, the availability of the network may be transient in nature from the view of the mobile node 100. In order to prevent the selection of a transient interface link which will cause needless handover, a system for influencing the interface selection based on stability of the network is desirable. This system is a reliable interface switching system for classifying available interfaces or links according to a history of events.

During the above-mentioned gathering of information, the mobile node 100 should also keep a record of the received information on the various interfaces. This record provides a history of the various possible links on the interfaces. This is different from the information storage previously described as not all the information obtained from any received broadcast needs to be stored. The record keeps track of the various sources of the broadcast information and attempts to classify links into stable and transient categories.

The record may be updated by processing received broadcasts, hints, events, triggers or any other information otherwise obtained regarding the potential points of attachment around the mobile node 100. For example, if the periodicity of received beacons is constant, it may be assumed that the access point from where the beacon is originated offers a relatively stable connection compared to another access point's beacon that is only received spasmodically.

Potential attachment points with a transient or unstable record may not be reported for consideration (consideration as a candidate of a handover target) when the node is choosing an alternative point of attachment to the network. The specific threshold for deciding whether or not to report a potential link is media specific and may or may not share a similar value to that used for classifying a record as stable. An example may be using the average signal strength of received beacons to determine if the link is to be reported to the node. Another example of a threshold might be the percentage of error packets received.

Figure 4:
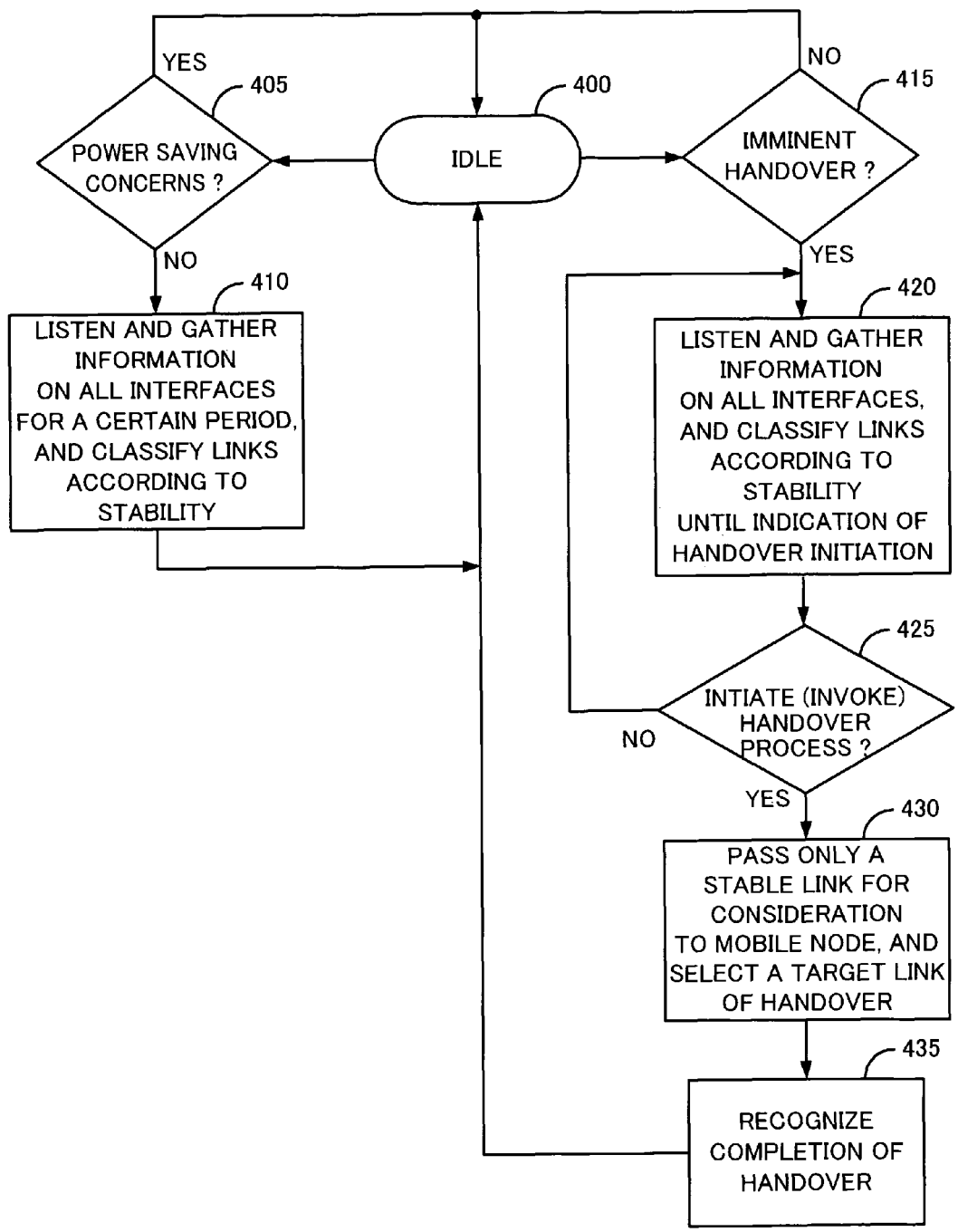
FIG. 4 is a state diagram showing reliable interface switching operation in the embodiments of the present invention.

The operation for reliable interface switching is shown in a state diagram of FIG. 4. The mobile node 100 starts off in an idle state (step 400). As shown by step 405, depending on its power policies, the mobile node 100 may be actively gathering and storing information on nearby potential points of attachment and also classifying links according to stability (step 410), or only start its listening and storage processing, and also classification of links according to stability (step 420), upon imminent handover (step 415).

When the handover process is determined (or indicated) to start, the handover process is promptly invoked (step 425) When the mobile node selects an interface or link to handover to, the information on the various possible points of attachment on all interfaces is consulted and only those that pass an arbitrary threshold value is passed to the mobile node 100 for consideration as a candidate of a handover target (step 430). The mobile node 100 selects one from the received candidates for handover. The mobile node then recognizes completion of any other necessary handover procedures (step 435) following which normal operating procedures will apply, and then returns to the initial state (the idle state of step 400). If the information on the selected interface or link has not yet stored (for example, in the case that the necessary information could not be gathered before the determination of starting the handover process), normal procedures will be taken back, and then information gathered from the next broadcasted beacon is passed to the mobile node.

Figure 5:
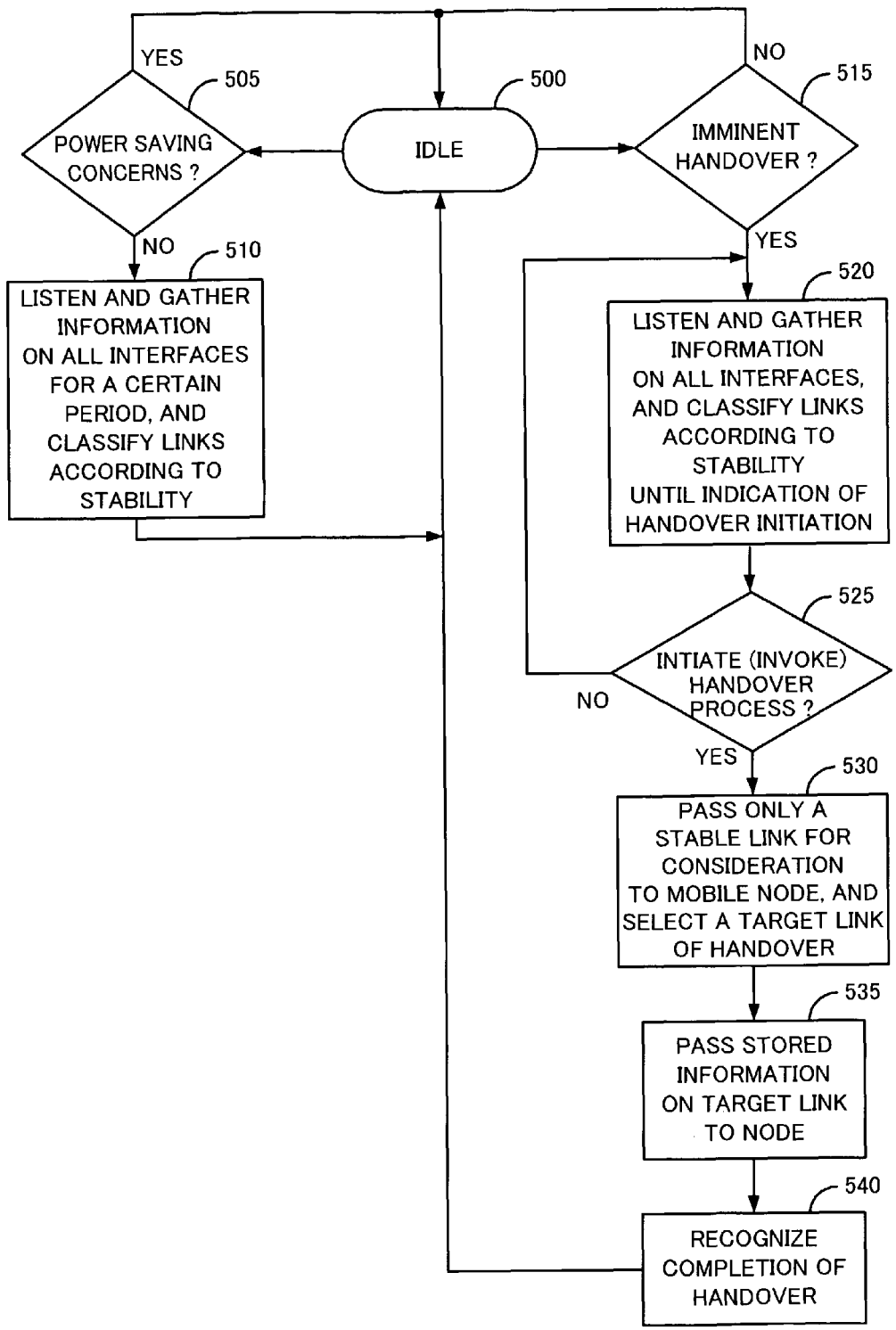
FIG. 5 is a state diagram showing fast and reliable interface switching integrative operation in the embodiments of the present invention.

The operation for reliable interface switching is shown in a state diagram of FIG. 5. The mobile node 100 starts off in an idle state (step 500). As shown by step 505, depending on its power policies, the mobile node may be actively gathering and storing information on nearby potential points of attachment and also classifying links according to stability (step 510), or only start its listening and storage processing and also classification of links according to stability (step 520), upon imminent handover (step 515). Note that the processing of information about nearby potential points of attachment and the storage of information which may be received via broadcast from them are separate processes and may be governed by different policies. Hence it may be possible for the mobile node 100 to be processing the information and classifying potential points of attachment into different levels of stability all the time while the storage of information is only activated upon such a time when handover is imminent.

When the handover process is determined (or indicated) to start, the handover process is promptly invoked (step 525). When the mobile node selects an interface or link to handover to, the information on the various possible points of attachment on all interfaces is consulted and only those that pass an arbitrary threshold value is passed to the mobile node 100 (step 535) for consideration as a candidate of a handover target (step 530). The mobile node 100 selects one from the received candidates for handover. The mobile node then recognizes completion of any other necessary handover procedures (step 540) following which normal operating procedures will apply, and then returns to the initial state (the idle state of step 500). If the information on the selected interface or link has not yet stored (for example, in the case that the necessary information could not be gathered before the determination of starting the handover process), normal procedures will be taken back, and then information gathered from the next broadcasted beacon is passed to the mobile node.

According to the prior art, when the mobile node 100 is roaming along the path 135, it would continuously handoff from the Base Station 105 to WLAN APs 110, 115, 120, 125 and 130 as it comes into contact with their network coverage. This is wasteful of network resources as well as causing a less than ideal user experience of constant interrupts as the mobile node reconfigures itself.

On the other hand, following the steps of the present invention, when the mobile node 100 is roaming, it first starts off connected via the Base Station 105. The interface detects the presence of WLAN APs 110 and 115 near the position A in FIG. 1. However, as the signal strength of both these WLAN APs 110 and 115 is low due to the mobile node 100 being at the edge of their coverage, the Stability Control Unit 220 records their presence but does not present them to the mobile node 100 as candidates for handover.

The above-mentioned event is repeated as the mobile node 100 roams from WLAN APs 110, 115, 120 and 125. The Configuration Control Unit 225 would store any received broadcast information (such as the beacon) from these WLAN APs 110, 115, 120 and 125, but the Stability Control Unit 220 would not pass them to the higher layer in the mobile node 100 for consideration as candidates for handover.

As the mobile node 100 roams to the coverage of WLAN AP 130, the Stability Control Unit 220 recognizes the stability of the received signal and passes information regarding the WLAN AP 130 as a candidate for handover to the higher layer in the mobile node 100. Assuming the policies of the mobile node 100 decide to handoff, the Configuration Control Unit 225 would pass any broadcast information such as previously received beacons and, if any, received higher layer configuration information to the higher layer. The mobile node 100 would then be able to configure itself to utilise WLAN AP 130 without waiting for the next beacon or information broadcasted from WLAN AP 130. This allows for handoffs resulting in greater network efficiency and a better network experience.

The mobile node 100 can send a remote trigger to request improvement of stability (reliability) of connection to a certain potential point of attachment when the mobile node 100 resides within the network coverage area of this potential point of attachment. Receiving this remote trigger, the potential point of attachment improves stability of connection to the mobile node 100 which is the source of the remote trigger by, for example, turning the electric power up or adjusting directional characteristics of the radio signals. The mobile node 100 recognizes the improvement regarding stability of the received signals and, as a result, it will be more likely that the mobile node 100 connects to this potential point of attachment.

Even though receiving the remote trigger, the potential point of attachment does not always have to improve stability of connection to the mobile node 100 which is the source of the remote trigger. The potential point of attachment may improve stability of connection to all of the mobile nodes which are the source of the remote trigger. The mobile potential point of attachment may improve stability of connection to a part of the mobile nodes (for example, the mobile nodes satisfying some other requirements or randomly selected) which are the sources of the remote trigger, however, neglect the remote triggers from the other mobile nodes.

When the mobile node 100 is roaming along the route 135 as per shown in FIG. 1, upon the detection of the WLAN APs 110, 115, 120, 125 and 130 (potential points of attachment), the mobile node 100 may optionally take an additional action of sending a remote trigger (the following Proximity notification message) to selected Potential Points of Attachment.

Figure 6:
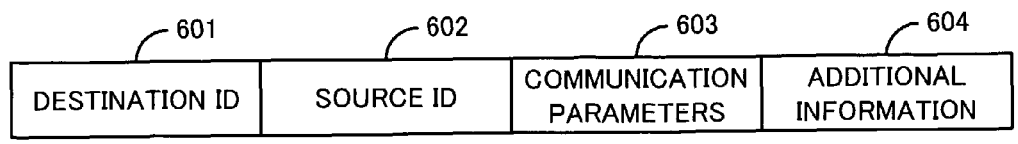
FIG. 6 is a diagram showing an example of information elements included in a Proximity Notification message sent from a mobile node in the embodiment of the present invention.

In FIG. 6, an example of information elements included in a Proximity Notification message sent from a mobile node in the embodiment of the present invention is illustrated. The Proximity Notification message illustrated in FIG. 6 is typically sent by the mobile node 100 to potential points of attachment. Receiving this Proximity Notification message, the potential point of attachment can perform the operation with respect to the mobile node 100.

For example, receiving the Proximity Notification message, the potential point of attachment can perform the operation to make the current communication link with the mobile node 100 more stable, the operation to enhance the communication link so as to establish the communication link with the mobile node 100 (that is, so as to induce the mobile node 100 to connect), or any proactive operation needed if the communication link is established with this mobile node 100.

To be more precise, the potential point of attachment may boost the strength of the sent signals (the electric power of signal sending) upon receipt of this Proximity Notification message. Furthermore, the potential point of attachment can turn the radio interface toward the mobile node 100 so as to adjust the directional characteristics of radio signals upon receiving the indication that the received signal strength is weak from the mobile node 100.

It should be noted that this Proximity Notification message may be created and sent independently or else piggy-backed upon other data, control or management plane messages exchanged between the mobile node 100 and its potential point of attachment.

The Proximity Notification message includes four fields to insert information elements (Destination ID field 601, Source ID field 602, Communication Parameter field 603, and Additional Information field 604) as shown in FIG. 6.

The Destination ID field 601 contains an identifier describing the target of this Proximity Notification message. An example of this identifier would be the APID of an IEEE802 Access Point or the MAC ID of an IEEE802 node.

The Source ID field 602 contains an identifier for the node that is sending this Proximity Notification message. An example of this identifier would be the MAC ID of the interface on the mobile node 100 sending this Proximity Notification message.

The Communication Parameters field 603 contains structured information describing the state of the communication such as physical communication characteristics and logical communication characteristics between the destination and source nodes. The mobile node 100 may send information such as the detected strength or quality of the signals received from the potential point of attachment. In other implementation, the Communication Parameters field 603 may also include transmission parameters of the mobile node 100 such as current transmitting power and maximum settings.

The Additional Information field 604 is an optional field that may include information such as authentication, location or mobility related information from the mobile node 100 for the potential point of attachment.

In order to send the aforementioned Proximity Notification message to the potential point of message, functionalities of the mobile node 100 illustrated in FIG. 2 must be enhanced. When the Management Entity 215 receives notification from the Stability Control Unit 220 that the potential point of attachment does not meet the criteria for stability, depending upon the policy obtained via the Policy Controller 230, the Management Entity 215 may send the aforementioned Proximity Notification message to the potential point of attachment via the relevant Media Interface 200, 205 and 210.

Figure 7:
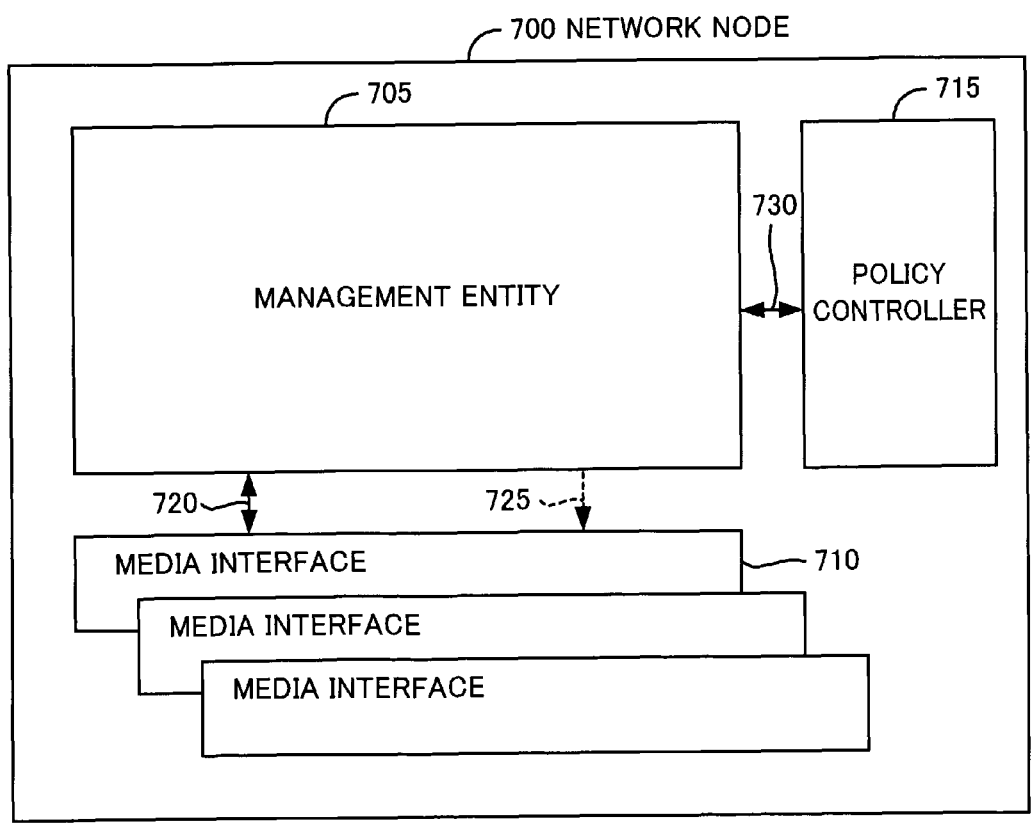
FIG. 7 is a block diagram showing an example of architecture of a network node (a potential point of attachment) in the embodiments of the present invention.

The potential point of attachment (network node 700) implements the functionalities described in FIG. 7 for processing the above-mentioned Proximity Notification message. FIG. 7 is a block diagram showing an example of architecture of a network node (a potential point of attachment) in the embodiments of the present invention.

The network node 700 includes one or more Media Interfaces 710. The relevant Media Interface 710, upon receiving the Proximity Notification message from the mobile node 100, should proceed to pass this Proximity Notification message via a message path 720 to the Management Entity 705.

The Management Entity 705 retrieves information included in the Proximity Notification message, and passes the information to the Policy Controller 715 via a message path 730 to consult with the Policy Controller 715 about the proper action to be performed. The Management Entity 705 receives the Policy Service provided from the Policy Controller 715. Upon determining the action to be performed based on this Policy Service, the Management Entity 705 may send a command to the relevant Media Interface 710 via a command path 725 to accordingly take appropriate steps such as the process to improve stability of the communication with the mobile node 100 and the proactive action to make the mobile node 100 promptly connect (start communicating). In a concrete example, the Management Entity 705 may direct the Media Interface 710 identified by the Proximity Notification message to increase the stability of the received signals on the mobile node 100 side.

The Management Entity 705 is located in the network node 700 in FIG. 7, but the Management Entity 705 can be located outside the network node 700 (physically in another location). For example, the Management Entity 705 may be located in an access router managing a plurality of access points. Similarly, the Policy Controller 715 can be located outside the network node 700.

When the Management Entity 705 is located outside the network node 700, Policy Service can be transported TCP/IP (Transmission Control Protocol/Internet Protocol) by using a network path for communicating to the Management Entity 705 residing outside the network node instead of a message path 730 in FIG. 7.

Figure 8:
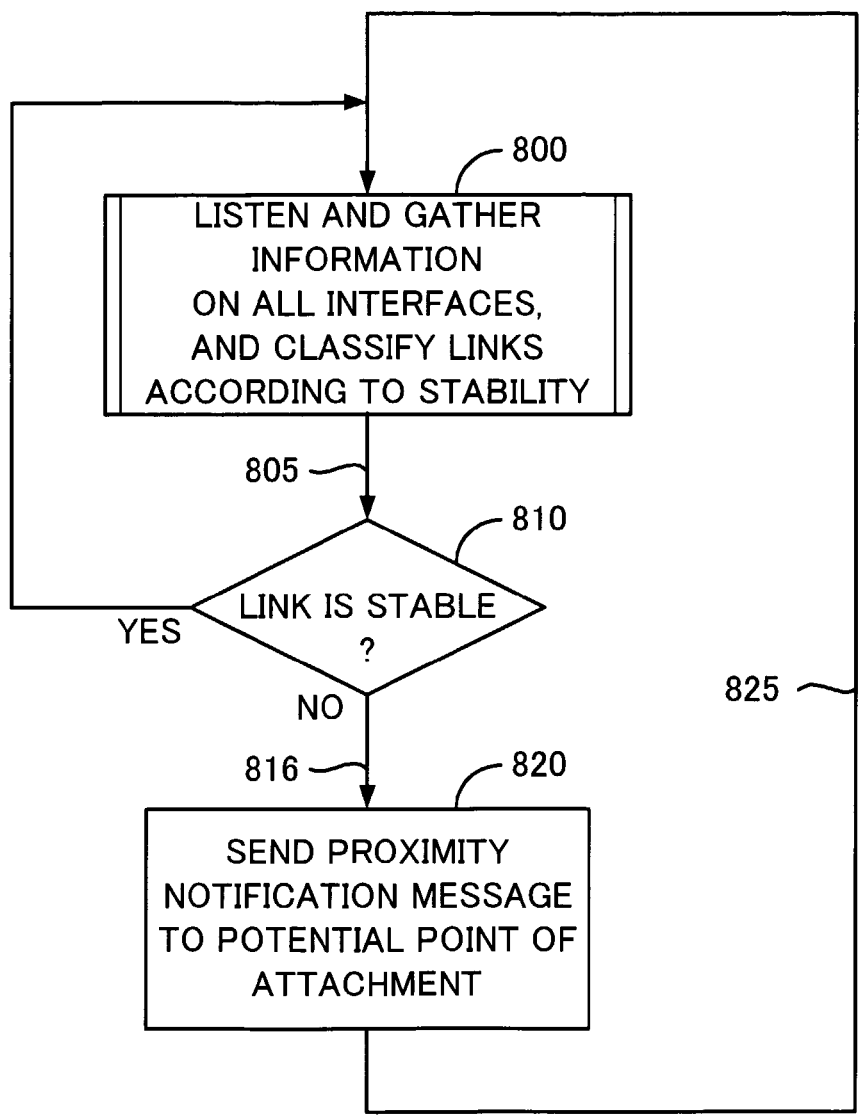
FIG. 8 is a state diagram showing an example of operation related to a Proximity Notification message in the embodiments of the present invention.

FIG. 8 is a state diagram showing an example of Operation related to a Proximity Notification message in the embodiments of the present invention. In the state diagram of FIG. 8, a summary is depicted about the additional behavior of the mobile node 100 having functionalities of sending a Proximity Notification message.

In FIG. 8, the mobile node 100 is always listening, gathering information on all the interfaces and classifying links (classifying links based on stability) (step 800). Furthermore, the mobile node 100 is monitoring whether the link is stable or not (step 810). When a link is considered to be stable, as shown by the loop of transitions 805 and 815, the mobile node 100 performs nothing special and continues to be monitoring the link state.

However should a link be found to be insufficiently stable (for example, the link classified as stable becomes lower than a certain class (a certain threshold), the Management. Entity 215 of the mobile node 100 may proceed to decide to send the selected potential point of attachment a Proximity Notification message (step 820). The Proximity Notification message is sent from the mobile node 100 to the potential point of attachment, and then returns to the link monitoring state again via transition 825.

Although, in the description, the invention has been shown and described in what is conceived to be the most practical and preferred embodiment, it will be appreciated by those skilled in the art that various modifications may be made in details of design and parameters such as variations in the design of the Management Entity 215 in FIG. 2, the Management Entity 715 in FIG. 7 or other components of the architecture without departing from the scope and ambit of the invention.

Each functional block used in the above-mentioned embodiments of the present invention is typically realized as an LSI (Large Scale Integrated Circuit) which is an Integrated Circuit. Functional blocks can be processed into 1-chip respectively, and part or all of functional blocks can be processed into 1-chip so as to be included in 1-chip. The above LSI can be called IC (Integrated Circuit), System LSI or Super LSI, according to the degree of integration.

Furthermore, the way to be processed into Integrated Circuit is not only to manufacture LSI but also to produce a dedicated circuit or a general processor. After manufacturing LSI, FPGA (Field Programmable Gate Array) to be programmable, or Reconfigurable Processor to be reconfigure connection or configuration of circuit cells in LSI can be utilized.

Furthermore, if another new technology of integration substituting for LSI appears due to development of the semiconductor technology or creation of another technology, functional blocks can be of course integrated by using the new technology. For example, the biological technology may be the new technology.

Industrial Applicability

The present invention has the advantage of achieving fast interface switching for seamless handover and/or performing efficient handover without unnecessary handover, and the advantage to improve stability of the communication (especially, link connection) of a radio communication terminal. The present invention can be applied to the communication field of the packet-switched data communication network.

The invention claimed is:

1. A radio communication terminal comprising:
    plural radio communication interface units, each of the plural radio communication interface units being configured to connect to one or plural base stations,
    a beacon information storing unit configured to store information which is included in a beacon signal, the beacon signal being periodically sent from at least one of the base stations and being received by at least one of the plural radio communication interface units, a beacon information retrieving unit configured to retrieve the information included in the beacon signal from the beacon information storing unit, the beacon signal being received by the at least one of the plural radio communication interface units which corresponds to a predetermined trigger, according to the receiving of the predetermined trigger, a communication control unit configured to control the starting of communication on the at least one of the plural radio communication interface units by using the information included in the beacon signal which is retrieved by the beacon information retrieving unit, a stability information storing unit configured to store information about a bit error rate of communication with the one or plural base stations which each of the plural radio communication interface units is configured to connect to, and a message sending unit configured to send a message requesting to improve directional characteristics of communication to one of the base stations having a bit error rate which is below a predetermined threshold level, referring to the information about the bit error rate stored in the stability information storing unit.

2. The radio communication terminal according to claim 1 wherein the message comprises at least identification information of the base station, identification information of the radio communication terminal, and communication characteristics information about communication with the base station.

3. The radio communication terminal according to claim 1, further comprising a stability evaluating unit configured to evaluate the bit error rate of communication between each of the plural radio communication interface units and the one or plural base stations based on the beacon signal received from the at least one base station by the at least one of the plural radio communication interface units, or based on information about a bit error rate of communication between other radio communication terminals and the at least one base station, the information being sent from the other radio communication terminals.

4. The radio communication terminal according to claim 3 wherein the stability evaluating unit is arranged to rank the base stations based on a time-variable pattern of the information about the bit error rate of communication or a frequency of detecting a plurality of the beacon signals.

5. A radio communication terminal comprising:

plural radio communication interface units, each of the plural radio communication interface units being configured to connect to one or plural base stations, a stability information storing unit configured to store information about a bit error rate of communication with the one or plural base stations which each of the plural radio communication interface units is configured to connect to, and a message sending unit configured to send a message requesting to improve directional characteristics of communication to one of the base stations having a bit error rate which is below a predetermined threshold level, referring to the information about the bit error rate stored in the stability information storing unit.

6. The radio communication terminal according to claim 5 wherein the message comprises at least identification information of the base station, identification information of the radio communication terminal, and communication characteristics information about communication with the base station.

* * * * *